(12) United States Patent
Kelly et al.

(10) Patent No.: US 8,133,116 B1
(45) Date of Patent: *Mar. 13, 2012

(54) SOCIAL SUPPLY HARVEST MECHANIC FOR INTERACTIVE SOCIAL GAMES

(75) Inventors: Sean Uberoi Kelly, San Francisco, CA (US); Alexander Michael Minh Khiem Le, San Francisco, CA (US)

(73) Assignee: Zynga Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/244,895

(22) Filed: Sep. 26, 2011

(51) Int. Cl.
*A63F 9/24* (2006.01)
*A63F 13/00* (2006.01)
*G06F 17/00* (2006.01)
*G06F 19/00* (2011.01)

(52) U.S. Cl. .............. 463/31; 463/1; 463/9; 463/25; 463/42; 705/26.2

(58) Field of Classification Search .......... 463/1, 9, 463/10, 13, 30–35, 40–43; 705/26.1, 26.2, 705/26.43

See application file for complete search history.

(56) References Cited

U.S. PATENT DOCUMENTS

| | | | | |
|---|---|---|---|---|
| 5,592,375 | A * | 1/1997 | Salmon et al. | 705/321 |
| 6,119,229 | A * | 9/2000 | Martinez et al. | 726/28 |
| 7,069,308 | B2 * | 6/2006 | Abrams | 709/218 |
| 7,305,398 | B2 * | 12/2007 | Teicher | 1/1 |
| 7,686,691 | B2 * | 3/2010 | Van Luchene | 463/29 |
| 7,955,175 | B1 * | 6/2011 | Holloway et al. | 463/42 |
| 2002/0090985 | A1 * | 7/2002 | Tochner et al. | 463/1 |
| 2003/0046221 | A1 * | 3/2003 | Hora | 705/37 |
| 2004/0259641 | A1 * | 12/2004 | Ho | 463/42 |
| 2005/0143174 | A1 * | 6/2005 | Goldman et al. | 463/42 |
| 2006/0121990 | A1 * | 6/2006 | O'Kelley et al. | 463/42 |
| 2006/0135264 | A1 * | 6/2006 | Shaw et al. | 463/42 |
| 2006/0190392 | A1 * | 8/2006 | Samid | 705/37 |

(Continued)

FOREIGN PATENT DOCUMENTS

JP 2002078975 A * 3/2002

(Continued)

OTHER PUBLICATIONS

"Social Games: A White Paper by VerticPortals" [online]. [dated Mar. 23, 2011]. [retrieved on Jan. 11, 2012]. Retrived From VerticPortals.com. <URL: http://www.verticportals.com/socialgaming/>. 16 Pages.*

(Continued)

*Primary Examiner* — Milap Shah
(74) *Attorney, Agent, or Firm* — Schwegman, Lundberg & Woessner P.A.

(57) ABSTRACT

Systems and methods that provide a social supply harvest mechanic for interactive social games are described. In some embodiments, a method receives a request for supplies from a first player in an interactive social game. The method presents multiple supply options to the first player, where each supply option has an associated processing time. A supply option selection is received from the first player as well as an identity of a second player. A supply fulfillment invitation is distributed to the second player. The processing time associated with the selected supply option is shortened if the second player accepts the supply fulfillment invitation. A visual indicator is presented to the first player upon completion of the processing time for the selected supply option. The visual indicator represents an availability of the requested supplies to the first player.

15 Claims, 8 Drawing Sheets

U.S. PATENT DOCUMENTS

| | | | |
|---|---|---|---|
| 2007/0111770 A1* | 5/2007 | Van Luchene | 463/7 |
| 2007/0117615 A1* | 5/2007 | Van Luchene | 463/25 |
| 2007/0129126 A1* | 6/2007 | Van Luchene | 463/1 |
| 2007/0129148 A1* | 6/2007 | Van Luchene | 463/42 |
| 2007/0265091 A1* | 11/2007 | Aguilar et al. | 463/42 |
| 2008/0004093 A1* | 1/2008 | Van Luchene et al. | 463/1 |
| 2008/0004094 A1* | 1/2008 | Mueller et al. | 463/1 |
| 2008/0004116 A1* | 1/2008 | Van Luchene et al. | 463/42 |
| 2008/0070697 A1* | 3/2008 | Robinson et al. | 463/42 |
| 2008/0086534 A1* | 4/2008 | Bardak et al. | 709/206 |
| 2008/0153595 A1* | 6/2008 | Chickering et al. | 463/42 |
| 2008/0189189 A1* | 8/2008 | Morgenstern | 705/26 |
| 2008/0207327 A1* | 8/2008 | Van Luchene et al. | 463/42 |
| 2008/0220876 A1* | 9/2008 | Mehta et al. | 463/42 |
| 2008/0303811 A1* | 12/2008 | Van Luchene | 345/419 |
| 2008/0313011 A1 | 12/2008 | Rose et al. | |
| 2009/0061999 A1 | 3/2009 | Popovich et al. | |
| 2009/0119188 A1* | 5/2009 | Pagan | 705/27 |
| 2009/0197681 A1* | 8/2009 | Krishnamoorthy et al. | 463/42 |
| 2009/0210324 A1* | 8/2009 | Bhogal et al. | 705/28 |
| 2009/0247282 A1* | 10/2009 | Cheng | 463/25 |
| 2009/0253494 A1* | 10/2009 | Fitch et al. | 463/25 |
| 2010/0004055 A1* | 1/2010 | Gormley et al. | 463/25 |
| 2010/0121729 A1* | 5/2010 | Betzler et al. | 705/26 |
| 2010/0125490 A1 | 5/2010 | Kiciman et al. | |
| 2010/0160038 A1* | 6/2010 | Youm et al. | 463/29 |
| 2010/0227675 A1* | 9/2010 | Luxton et al. | 463/25 |
| 2010/0317419 A1* | 12/2010 | Osborne | 463/1 |
| 2011/0081967 A1* | 4/2011 | Butcher et al. | 463/35 |
| 2011/0212762 A1* | 9/2011 | Ocko et al. | 463/25 |
| 2011/0225069 A1* | 9/2011 | Cramer et al. | 705/27.1 |
| 2011/0264489 A1* | 10/2011 | Ganetakos et al. | 705/12 |
| 2011/0300923 A1* | 12/2011 | Van Luchene | 463/25 |

FOREIGN PATENT DOCUMENTS

| | | | |
|---|---|---|---|
| JP | 2006158899 A | * | 6/2006 |

OTHER PUBLICATIONS

"Cityville Walkthrough" [online]. [dated Dec. 4, 2010]. [retrieved on Jan. 11, 2012]. Retrived from Gamezebo.com. <URL: http://www.gamezebo.com/games/cityville/walkthrough>. 23 Pages.*

"Guide for Using the CityVille Train Station" [online]. [dated Jan. 3, 2011]. [retrieved on Jan. 11, 2012]. Retrieved from CityVilleInfo.com. <URL: http://www.cityvilleinfo.com/guide-for-using-the-cityville-train-station/>. 3 Pages.*

"CityVille Updated Train System: Everything You Need to Know" [online]. [dated Mar. 19, 2011]. [retrived on Jan. 11, 2012]. Retrieved from Games.com. <URL: http://blog.games.com/2011/03/19/cityville-updated-train-system-everything-you-ned-to-know/>. 3 Pages.*

Kwong, Justin A. "Getting the Goods on Virtual Items: A Fresh Look at Transactions in Multi-User Online Environments". William Mitchell Law Review, v.37, No. 4, 2011 Summer, pp. 1805-1837 (ISSN: 0270-272X).*

"Selling in the Marketplace". Second Life Knowledge Base. [online]. [dated Nov. 29, 2011]. [retrieved on Jan. 11, 2012]. Retrieved from SecondLife.com. <URL: http://community.secondlife.com/t5/tkb/articleprintpage/tkb-id/English_KB%40tkb/article-id/90>. 4 Pages.*

"Shopping in the Marketplace". Second Life Knowledge Base. [online]. [dated Nov. 14, 2011]. [retrieved on Jan. 11, 2012]. Retrieved from SecondLife.com. <URL: http://community.secondlife.com/t5/tkb/articleprintpage/tkb-id/English_KB%40tkb/article-id/91>. 5 Pages.*

"The Sims Social" From Wikipedia, The Free Encyclopedia. [online]. [retrieved Jan. 12, 2012]. <URL: http://en.wikipedia.org/wiki/The_Sims_Social>. 9 Pages.*

"Social Network Game" From Wikipedia, The Free Encyclopedia. [online]. [retrieved Jan. 12, 2012]. <URL: http://en.wikipedia.org/wiki/Social_network_game>. 5 Pages.*

"Virtual Economy" From Wikipedia, The Free Encyclopedia. [online]. [retrieved Jan. 12, 2012]. <URL: http://en.wikipedia.org/wiki/Virtual_economy>. 12 Pages.*

Passman, Michael H. "Transactions of Virtual Items in Virtual Worlds". Albany Law Journal of Science and Technology, v.18, No. 1, 2008, pp. 259-292.*

Guo, Yue et al. "Why Do People Buy Virtual Items in Virtual Worlds? An Empiracal Test of a Conceptual Model" 17th European Conference on Information Systems. 2009. 14 Pages.*

"International Application Serial No. PCT/US2011/045786, Search Report mailed Jan. 3, 2012" 2 pgs.

"International Application Serial No. PCT/US2011/045786, Written Opinion mailed Jan. 3, 2012", 6 pgs.

* cited by examiner

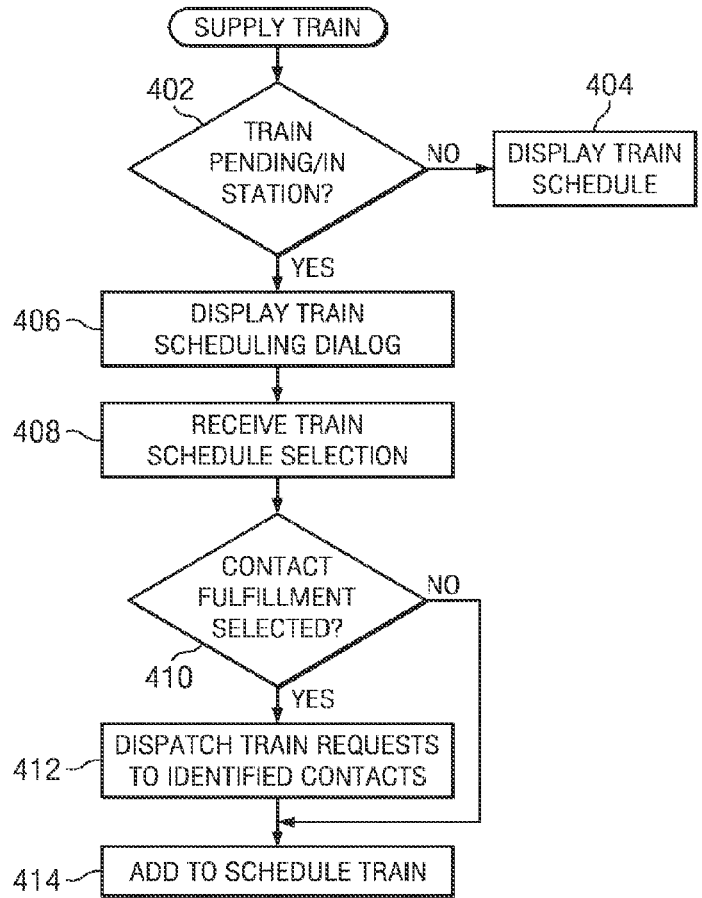
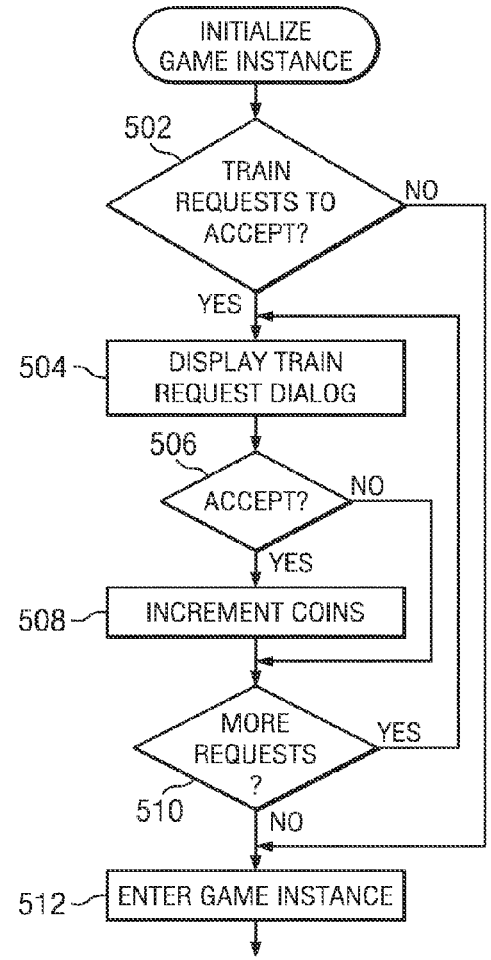
FIG. 4
FIG. 5

SOCIAL SUPPLY HARVEST MECHANIC FOR INTERACTIVE SOCIAL GAMES

CLAIM OF PRIORITY

This application claims the benefit of priority to U.S. patent application Ser. No. 12/947,356, entitled "SOCIAL SUPPLY HARVEST MECHANIC FOR INTERACTIVE SOCIAL GAMES," filed on Nov. 16, 2010, which is hereby incorporated by reference herein in its entirety.

TECHNICAL FIELD

The present disclosure generally relates to games and applications in general and, in particular embodiments, to computer-implemented, online social games.

BACKGROUND

In many games, there is a virtual world or some other imagined playing space where a player/user of the game controls one or more player characters (herein "character," "player character," or "PC"). Player characters can be considered in-game representations of the controlling player. As used herein, the terms "player," "user," "entity," and "friend" may refer to the in-game player character controlled by that player, user, entity, or friend, unless context suggests otherwise. The game display can display a representation of the player character. A game engine accepts inputs from the player, determines player character actions, decides outcomes of events and presents the player with a game display illuminating what happened. In some games, there are multiple players, wherein each player controls one or more player characters.

In many computer games, there are various types of in-game assets (aka "rewards" or "loot") that a player character can obtain within the game. For example, a player character may acquire game points, gold coins, experience points, character levels, character attributes, virtual cash, game keys, or other in-game items of value. In many computer games, there are also various types of in-game obstacles that a player must overcome to advance within the game. In-game obstacles can include tasks, puzzles, opponents, levels, gates, actions, etc. In some games, a goal of the game may be to acquire certain in-game assets, which can then be used to complete in-game tasks or to overcome certain in-game obstacles. For example, a player may be able to acquire a virtual key (i.e., the in-game asset) that can then be used to open a virtual door (i.e., the in-game obstacle).

An electronic social networking system typically operates with one or more social networking servers providing interaction between users such that a user can specify other users of the social networking system as "friends." A collection of users and the "friend" connections between users can form a social graph that can be traversed to find second, third and more remote connections between users, much like a graph of nodes connected by edges can be traversed.

Many online computer games are operated on an online social network. Such a network allows both users and other parties to interact with the computer games directly, whether to play the games or to retrieve game- or user-related information. Internet users may maintain one or more accounts with various service providers, including, for example, online game networking systems and online social networking systems. Online systems can typically be accessed using browser clients (e.g., Firefox, Chrome, Internet Explorer).

In many computer games, there are various types of in-game actions that a player character can make within the game. For example, a player character in an online role-playing game may be able to interact with other player characters, build a virtual house, attack enemies; go on a quest, go to a virtual store to buy/sell virtual items, etc. A player character in an online poker game may be able to play at specific tables, place bets of virtual currency for certain amounts, play or fold certain hands, play in a online poker tournament, etc.

BRIEF DESCRIPTION OF THE DRAWINGS

FIG. 4 is a flow chart illustrating an example process flow, illustrates an example of a game interface for an online game.
FIG. 5 is a flow chart illustrating an example process flow.

DESCRIPTION OF EXAMPLE EMBODIMENTS

Figure 1:
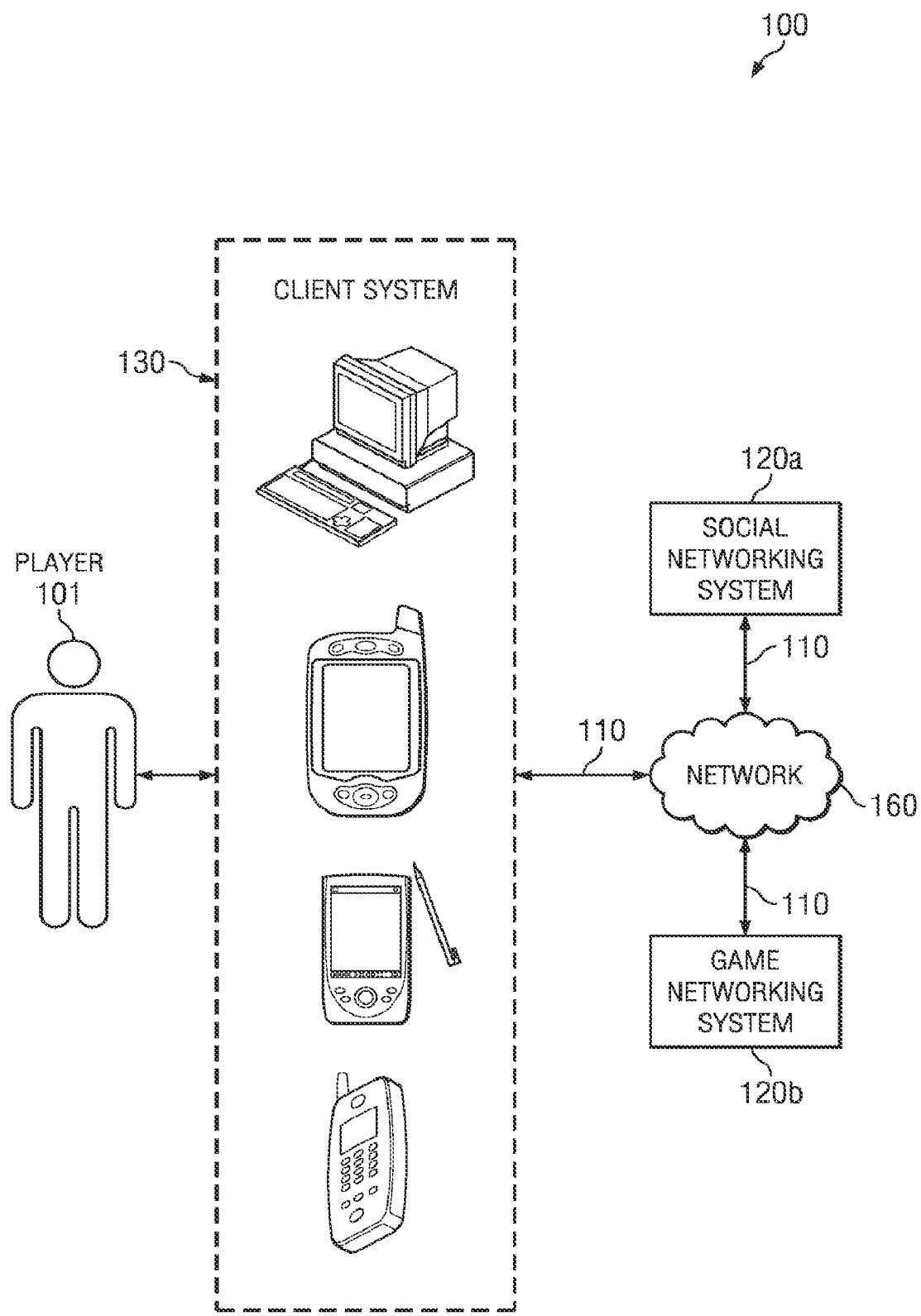
FIG. 1 illustrates an example of a system for implementing particular disclosed embodiments.

FIG. 1 illustrates an example of a system for implementing various disclosed embodiments. In particular embodiments, system 100 comprises player 101, social network system 120a, game networking system 120b, client system 130, and network 160. The components of system 100 can be connected to each other in any suitable configuration, using any suitable type of connection. The components may be connected directly or over a network 160, which may be any suitable network. For example, one or more portions of network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Social network system 120a is a network-addressable computing system that can host one or more social graphs. Social networking system 120a can generate, store, receive, and transmit social networking data. Social network system 120a can be accessed by the other components of system 100 either directly or via network 160. Game networking system 120b is a network-addressable computing system that can host one or more online games. Game networking system 120b can generate, store, receive, and transmit game-related data, such as, for example, game account data, game input, game state data, and game displays. Game networking system 120b can be accesses by the other components of system 100 either directly or via network 160. Player 101 may use client system 130 to access, send data to, and receive data from social network system 120a and game networking system 120b. Client system 130 can access social networking system 120 or game networking system 120b directly, via network 160, or via a third-party system. As an example and not by way of limitation, client system 130 may access game networking system 120*b* via social networking system 120*a*. Client system 130 can be any suitable computing device, such as a personal computer, laptop, cellular phone, smart phone, computing tablet, etc.

Although FIG. 1 illustrates a particular number of players 101, social network systems 120*a*, game networking systems 120*b*, client systems 130, and networks 160, this disclosure contemplates any suitable number of players 101, social network systems 120*a*, game networking systems 120*b*, client systems 130, and networks 160. As an example and not by way of limitation, system 100 may include one or more game networking systems 120*b* and no social networking systems 120*a*. As another example and not by way of limitation, system 100 may include a system that comprises both social networking system 120*a* and game networking system 120*b*. Moreover, although FIG. 1 illustrates a particular arrangement of player 101, social network system 120*a*, game networking system 120*b*, client system 130, and network 160, this disclosure contemplates any suitable arrangement of player 101, social network system 120*a*, game networking system 120*b*, client system 130, and network 160.

The components of system 100 may be connected to each other using any suitable connections 110. For example, suitable connections 110 include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 110 each include an ad hoc network, an intranet, an extranet, a VPN, a LAIN, a WLAN, a WAN, a WWAN, a MAN, a portion of the Internet, a portion of the PSTN, a cellular telephone network, or another type of connection, or a combination of two or more such connections. Connections 110 need not necessarily be the same throughout system 100. One or more first connections 110 may differ in one or more respects from one or more second connections 110. Although FIG. 1 illustrates particular connections between player 101, social network system 120*a*, game networking system 120*b*, client system 130, and network 160, this disclosure contemplates any suitable connections between player 101, social network system 120*a*, game networking system 120*b*, client system 130, and network 160. As an example and not by way of limitation, in particular embodiments, client system 130 may have a direct connection to social network system 120*a* or game networking system 120*b*, bypassing network 160.

Online Games and Game Systems

In an online computer game, a game engine manages the game state of the game. Game state comprises all game play parameters, including player character state, non-player character (NPC) state, in-game object state, game world state (e.g., internal game clocks, game environment), and other game play parameters. Each player 101 controls one or more player characters (PCs). The game engine controls all other aspects of the game, including non-player characters (NPCs), and in-game objects. The game engine also manages game state, including player character state for currently active (online) and inactive (offline) players.

An online game can be hosted by game networking system 120*b*, which can be accessed using any suitable connection with a suitable client system 130. A player may have a game account on game networking system 120*b*, wherein the game account can contain a variety of information associated with the player (e.g., the player's personal information, financial information, purchase history, player character state, game state). In some embodiments, a player may play multiple games on game networking system 120*b*, which may maintain a single game account for the player with respect to all the games, or multiple individual game accounts for each game with respect to the player. In some embodiments, game networking system 120*h* can assign a unique identifier to each player 101 of an online game hosted on game networking system 120*b*. Game networking system 120*b* can determine that a player 101 is accessing the online game by reading the user's cookies, which may be appended to HTTP requests transmitted by client system 130, and/or by the player 101 logging onto the online game.

In particular embodiments, player 101 may access an online game and control the game's progress via client system 130 (e.g., by inputting commands to the game at the client device). Client system 130 can display the game interface, receive inputs from player 101, transmitting user inputs or other events to the game engine, and receive instructions from the game engine. The game engine can be executed on any suitable system (such as, for example, client system 130, social networking system 120*a*, or game networking system 120*b*). As an example and not by way of limitation, client system 130 can download client components of an online game, which are executed locally, while a remote game server, such as game networking system 120*b*, provides back-end support for the client components and may be responsible for maintaining application data of the game, processing the inputs from the player, updating and/or synchronizing the game state based on the game logic and each input from the player, and transmitting instructions to client system 130. As another example and not by way of limitation, each time player 101 provides an input to the game through the client system 130 (such as, for example, by typing on the keyboard or clicking the mouse of client system 130), the client components of the game may transmit the player's input to game networking system 120*b*.

Game Systems, Social Networks, and Social Graphs

In an online multiplayer game, players may control player characters (PCs), a game engine controls non-player characters (NPCs) and game features, and the game engine also manages player character state and game state and tracks the state for currently active (i.e., online) players and currently inactive (i.e., offline) players. A player character can have a set of attributes and a set of friends associated with the player character. As used herein, the term "player character state" can refer to any in-game characteristic of a player character, such as location, assets, levels, condition, health, status, inventory, skill set, name, orientation, affiliation, specialty, and so on. Player characters may be displayed as graphical avatars within a user interface of the game. In other implementations, no avatar or other graphical representation of the player character is displayed. Game state encompasses the notion of player character state and refers to any parameter value that characterizes the state of an in-game element, such as a non-player character, a virtual object (such as a wall or castle), etc. The game engine may use player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character. In some embodiments, the game engine can assign a unique client identifier to each player.

In particular embodiments, player 101 may access particular game instances of an online game. A game instance is copy of a specific game play area that is created during runtime. In particular embodiments, a game instance is a discrete game play, area where one or more players 101 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more players 101 and one or more in-game objects controlled by the game engine. When accessing an online game, the game engine may allow player 101 to select a particular game instance to play from a plurality of game instances. Alternatively, the game engine may automatically select the game instance that player 101 will access. In particular embodiments, an online game comprises only one game instance that all players 101 of the online game can access.

In particular embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may be populated with the first player's PC and one or more in-game objects associated with the first player. In particular embodiments, a game instance associated with a specific player may only be accessible by that specific player. As an example and not by way of limitation, a first player may access a first game instance when playing an online game, and this first game instance may be inaccessible to all other players. In other embodiments, a game instance associated with a specific player may be accessible by one or more other players, either synchronously or asynchronously with the specific player's game play. As an example and not by way of limitation, a first player may be associated with a first game instance, but the first game instance may be accessed by all first-degree friends in the first player's social network. In particular embodiments, the game engine may create a specific game instance for a specific player when that player accesses the game. As an example and not by way of limitation, the game engine may create a first game instance when a first player initially accesses an online game, and that same game instance may be loaded each time the first player accesses the game. As another example and not by way of limitation, the game engine may create a new game instance each time a first player accesses an online game, wherein each game instance may be created randomly or selected from a set of predetermined game instances. In particular embodiments, the set of in-game actions available to a specific player may be different in a game instance that is associated with that player compared to a game instance that is not associated with that player. The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm. If the first player accesses game instance associated with another player, such as Whiteacre Farm, the game engine may not allow the first player to plant crops in that game instance. However, other in-game actions may be available to the first player, such as watering or fertilizing crops on Whiteacre Farm.

In particular embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph, This disclosure assumes that at least one entity of a social graph is a player or player character in an online multiplayer game, though this disclosure any suitable social graph users.

The minimum number of edges required to connect a player (or player character) to another user is considered the degree of separation between them. For example, where the player and the user are directly connected (one edge), they are deemed to be separated by one degree of separation. The user would be a so-called "first-degree friend" of the player. Were the player and the user are connected through one other user (two edges), they are deemed to be separated by two degrees of separation. This user would be a so-called "second-degree friend" of the player. Where the player and the user are connected through N edges for N−1 other users), they are deemed to be separated by N degrees of separation. This user would be a so-called "Nth-degree friend." As used herein, the term "friend" means only first-degree friends, unless context suggests otherwise.

Within the social graph, each player (or player character) has a social network. A player's social network includes all users in the social graph within $N_{max}$ degrees of the player, where $N_{max}$ is the maximum degree of separation allowed by the system managing the social graph (such as, for example, social networking system 120a or game networking system 120b). In one embodiment, $N_{max}$ equals 1, such that the player's social network includes only first-degree friends. In another embodiment, $N_{max}$ is unlimited and the player's social network is coextensive with the social graph.

In particular embodiments, the social graph is managed by game networking system 120b, which is managed by the game operator. In other embodiments, the social graph is part of a social networking system 120a managed by a third-party (e.g., Facebook, Friendster, Myspace). In yet other embodiments, player 101 has a social network on both game networking system 120b and social networking system 120a, wherein player 101 can have a social network on the game networking system 120b that is a subset, superset, or independent of the player's social network on social networking system 120a. In such combined systems, game network system 120b can maintain social graph information with edge type attributes that indicate whether a given friend is an "in-game friend," an "out-of-game friend," or both. The various embodiments disclosed herein are operable when the social graph is managed by social networking system 120a, game networking system 120b, or both.

Figure 2:
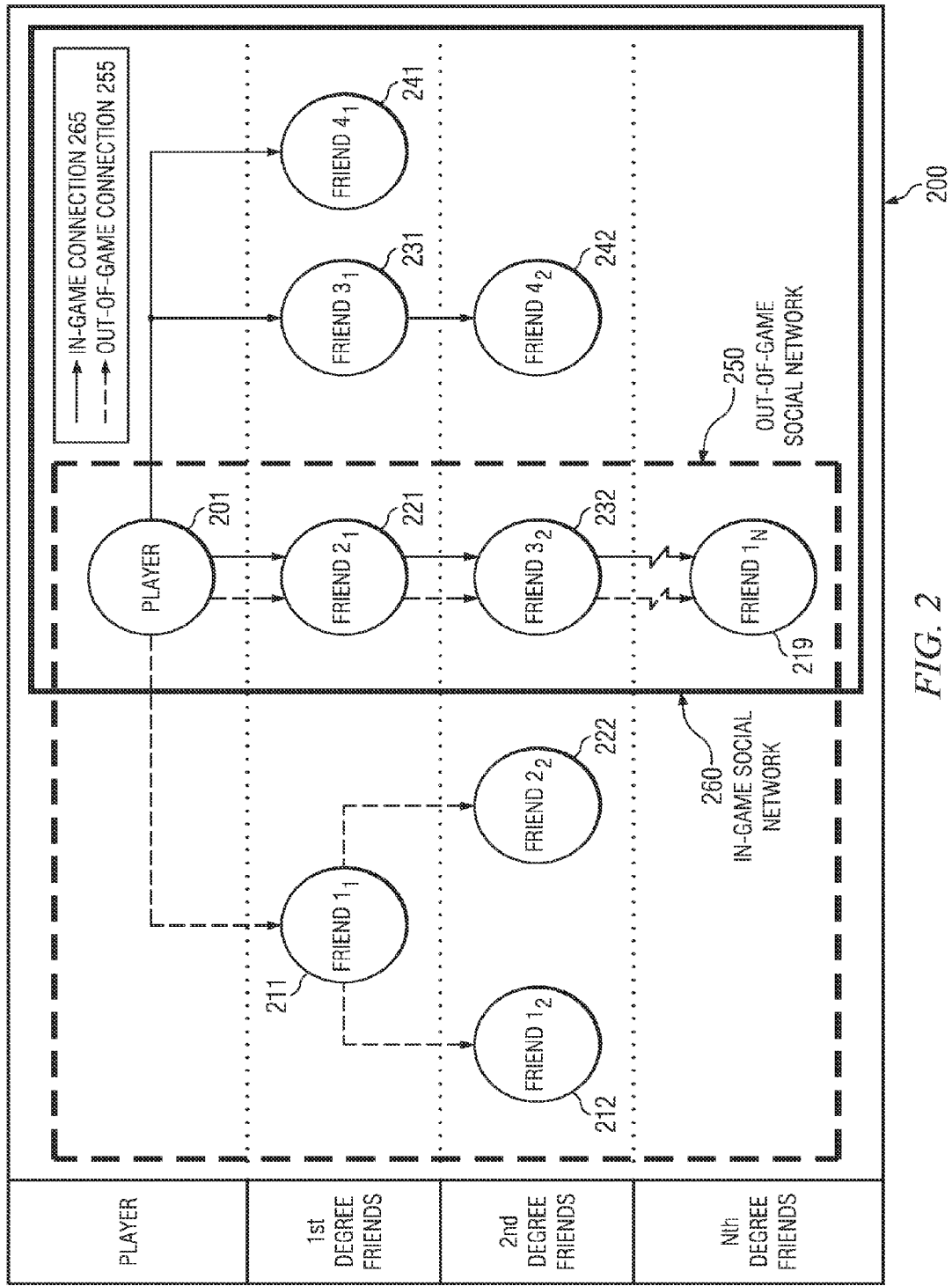
FIG. 2 illustrates an example social network.

FIG. 2 shows an example of a social network within a social graph. As shown, Player 201 can be associated, connected or linked to various other users, or "friends," within the social network 250. These associations, connections or links can track relationships between users within the social network 250 and are commonly referred to as online "friends" or "friendships" between users. Each friend or friendship in a particular user's social network within a social graph is commonly referred to as a "node." For purposes of illustration and not by way of limitation, the details of social network 250 will be described in relation to Player 201. As used herein, the terms "player" and "user" can be used interchangeably and can refer to any user or character in an online multiuser game system or social networking system. As used herein, the term "friend" can mean any node within a player's social network.

As shown in FIG. 2, Player 201 has direct connections with several friends. When Player 201 has a direct connection with another individual, that connection is referred to as a first-degree friend. In social network 250, Player 201 has two first-degree friends. That is, Player 201 is directly connected to Friend $1_1$ 211 and Friend $2_1$ 221. In a social graph, it is possible for individuals to be connected to other individuals through their first-degree friends (i.e., friends of friends). As described above, each edge required to connect a player to another user is considered the degree of separation. For example, FIG. 2 shows that Player 201 has three second-degree friends to which he is connected via his connection to his first-degree friends. Second-degree Friend $1_2$ 212 and Friend $2_2$ 222 are connected to Player 201 via his first-degree Friend $1_1$ 211. The limit on the depth of friend connections, or the number of degrees of separation for associations, that Player 201 is allowed is typically dictated by the restrictions and policies implemented by social networking system 120a.

In various embodiments, Player 201 can have Nth-degree friends connected to him through a chain of intermediary degree friends as indicated in FIG. 2. For example, Nth-degree Friend $1_N$ 219 is connected to Player 201 via second-degree Friend $3_2$ 232 and one or more other higher-degree friends. Various embodiments may take advantage of and utilize the distinction between the various degrees of friendship relative to Player 201.

In particular embodiments, a player (or player character) can have a social graph within an online multiplayer game that is maintained by the game engine and another social graph maintained by a separate social networking system. FIG. 2 depicts an example of in-game social network 260 and out-of-game social network 250. In this example, Player 201 has out-of-game connections 255 to a plurality of friends, forming out-of-game social network 250. Here, Friend $1_1$ 211 and Friend $2_1$ 221 are first-degree friends with Player 201 in his out-of-game social network 250. Player 201 also has in-game connections 265 to a plurality of players, forming in-game social network 260. Here, Friend $2_1$ 221, Friend $3_1$ 231, and Friend $4_1$ 241 are first-degree friends with Player 201 in his in-game social network 260. In some embodiments, it is possible for a friend to be in both the out-of-game social network 250 and the in-game social network 260. Here, Friend $2_1$ 221 has both an out-of-game connection 255 and an in-game connection 265 with Player 201, such that Friend $2_1$ 221 is in both Player 201's in-game social network 260 and Player 201's out-of-game social network 250.

As with other social networks, Player 201 can have second-degree and higher-degree friends in both his in-game and out of game social networks. In some embodiments, it is possible for Player 201 to have a friend connected to him both in his in-game and out-of-game social networks, wherein the friend is at different degrees of separation in each network. For example, if Friend $2_2$ 222 had a direct in-game connection with Player 201, Friend $2_2$ 222 would be a second-degree friend in Player 201's out-of-game social network, but a first-degree friend in Player 201's in-game social network. In particular embodiments, a game engine can access in-game social network 260, out-of-game social network 250, or both.

In particular embodiments, the connections in a player's in-game social network can be formed both explicitly (e.g., users must "friend" each other) and implicitly (e.g., system observes user behaviors and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (i.e., in disintermediated interactions or the like), but that could be the case.

Game Systems

A game event may be an outcome of an engagement, a provision of access, rights and/or benefits, or the obtaining of some assets (e.g., health, money, strength, inventory, land, etc.). A game engine determines the outcome of a game event according to a variety of factors, such as the game rules, a player character's in-game actions, player character state, game state, interactions of other player characters, and random calculations. Engagements can include simple tasks (e.g., plant a crop, clean a stove), complex tasks (e.g., build a farm or business, run a café), or other events.

An online game can be hosted by a game networking system 320, which can be accessed over any suitable network with an appropriate client system 330. A player may have a game system account on game system 320, wherein the game system account can contain a variety of information about the player (e.g., the player's personal information, player character state, game state, etc.). In various embodiments, an online game can be embedded into a third-party website. The game can be hosted by the networking system of the third-party website, or it can be hosted on game system 320 and merely accessed via the third-party website. The embedded online game can be hosted solely on a server of game system 320 or using a third-party vendor server. In addition, any combination of the functions of the present disclosure can be hosted on or provided from any number of distributed network resources. For example, one or more executable code objects that implement all or a portion of the game can be downloaded to a client system for execution.

Game Interfaces

Figure 3:
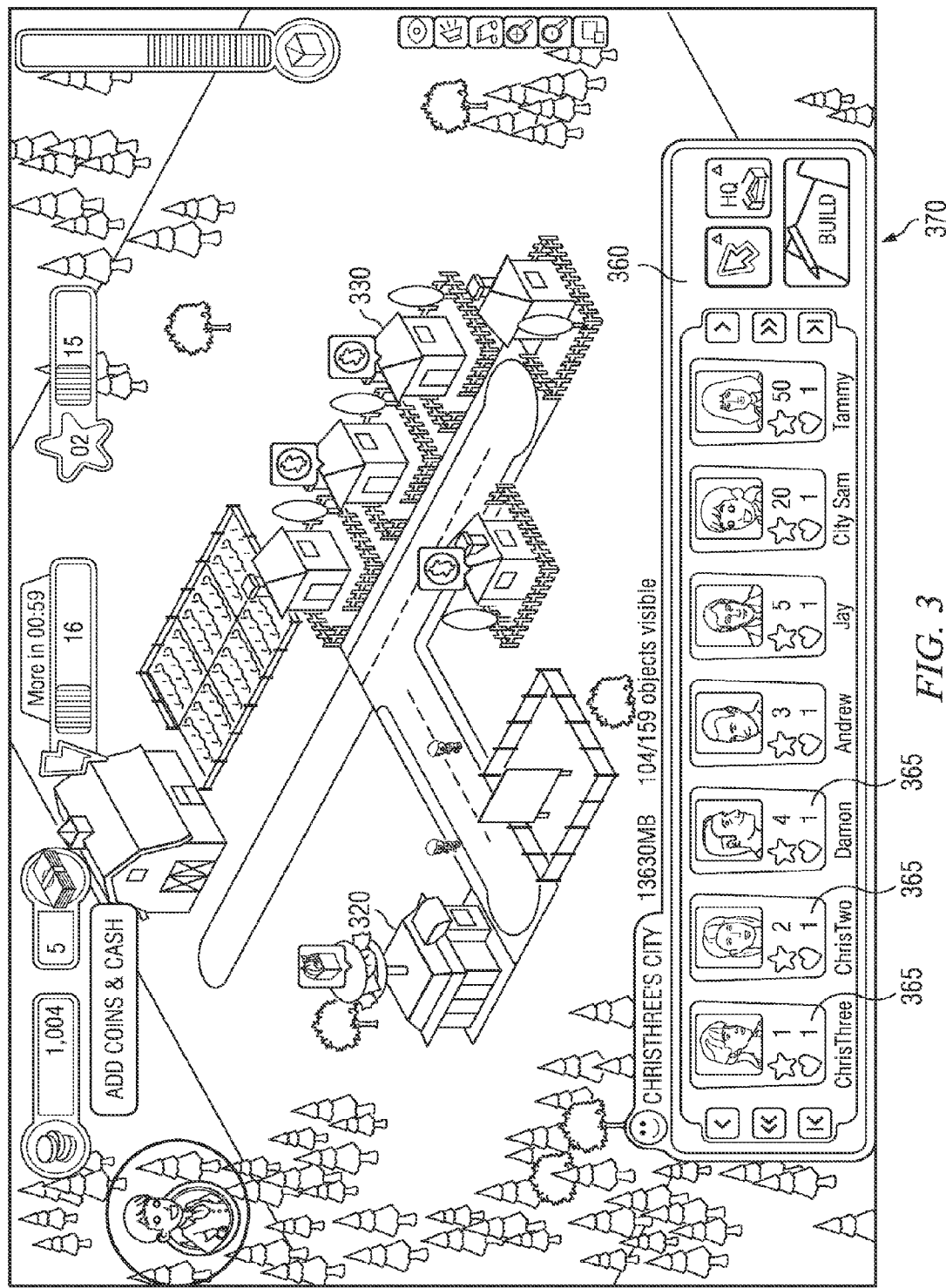
FIG. 3 illustrates an example of a game interface for an online game.

FIG. 3 illustrates an example of a webpage-based game interface for an online game accessed by a browser client (e.g., Firefox, Chrome, Internet Explorer, etc.). In various embodiments, a user of a client system 130 can use a browser client to access the online game over the Internet (or other suitable network). The game interface 370 illustrated in FIG. 3 may be automatically generated and presented to the user in response to the user visiting or accessing the game operator's website or a third-party's website from client system 130 with a browser client. Game system 120b can transmit data to client system 130 allowing it to display game interface 370, which is typically some type of graphic user interface. For example, the webpage downloaded to client system 130 may include an embedded call that causes client system 130 to download an executable object, such as a Flash .SWF object, which executes on client system 130 and renders the game within the context of the webpage. Other interface types are possible, such as server-side rendering and the like. Game interface 370 is configured to receive signals from the user via client system 130. For example, the user can click on game interface 370, or enter commands from a keyboard or other suitable input device. The game engine can respond to these signals to allow game play. The display of game interface 370 can change based on the output of the game engine, the input of the player, and other signals from game system 120b and client system 130.

The game interface 370 can display various game components, such as the game environment, options available to the player (e.g., in-game actions, preferences, settings, etc.), game results, etc. Some components of the game interface may be static, while others may be dynamic (e.g., changing with game play). The user may be able to interact with some components (e.g., player character, NPCs, virtual objects, etc.) and not interact with other components (e.g., the background of the virtual world, such as the virtual street or sidewalk). The user can engage in specific in-game actions or activities by providing input to game interface 370.

In the example online game illustrated in FIG. 3, the user controls a virtual city implemented in an online social game. Game interface 370 shows the virtual city and various components of the city. The player can interact with various elements of the café, such as the virtual business objects 320 and virtual housing objects 330. The user can click on for otherwise activate) various aspects of the game interface to provide instructions to the game engine. For example, by clicking on a virtual business object 320, the user can initiate a harvest mechanic cycle as described in more detail below.

The user can also click on various icons in game interface 370 to activate various game options. For example, if the user clicks on one of the icons in option bar 360, the game engine will alter the game interface 370 to present the user with options for buying and selling virtual items for use in the virtual city. For example, the player could buy or sell virtual furniture, appliances, décor, windows, goods, etc. Similarly, the user can click on other icons in option bar 360 to access other game options.

One skilled in the art would appreciate that FIG. 3 is presented merely as an example of an embodiment of one type of online game and that the present disclosure is intended to encompass a variety of game types, including gambling games, role-playing games, puzzle games, etc.

Virtual Currency

In various embodiments, players within the game can acquire virtual currency. In such games, the virtual currency might be represented by virtual coins, virtual cash, or by a number or value stored by the server for that player's benefit. Such virtual currency represents units of value for use in the online game system, and is analogous to legal currency. Virtual currency can be purchased in one or more actual cash or credit transactions by a player, where the legal currency is transferred using a credit/debit/charge card transaction conveyed over a financial network. In some embodiments, a player may earn virtual currency by taking action in the game. For example, a player may be rewarded with one or more units of virtual currency after completing a task, quest, challenge, or mission within the game. For example, a farming game might reward 10 gold coins each time a virtual crop is harvested.

In some embodiments, virtual currency can be used to purchase one or more in-game assets or other benefits. For example, a player may be able to exchange virtual currency for a desired level, access, right, or item in an online game. In one embodiment, legal currency can be used to directly purchase an in-game asset or other benefit. The player can select the desired in-game asset or other benefit. Once the necessary selections are made, the player can place the order to purchase the in-game asset or other benefit. This order is received by the game system 320, which can then process the order, if the order is processed successfully, an appropriate financial account associated with the player can be debited by the amount of virtual currency or legal currency needed to buy the selected in-game asset or other benefit.

In some embodiments, multiple types of virtual currency may be available for purchase from the game system operator. For example, an online game may have virtual gold coins and virtual cash. The different types of virtual currency may have different exchange rates with respect to legal currency and each other. For example, a player may be able to exchange $1 in legal currency for either 100 virtual gold coins or $2 in virtual cash, but virtual gold coins may not be exchanged for virtual cash. Similarly, where in-game assets and other benefits can be purchased with virtual currency, they may have different exchange rates with respect to the different types of virtual currency. For example, a player may be able to buy a virtual business object for $10 in virtual cash, but may not purchase the virtual business object for virtual gold coins alone. In some embodiments, certain types of virtual currency can be acquired by engaging in various in-game actions while other types of virtual currency can only be acquired by exchanging legal currency. For example, a player may be able to acquire virtual gold coins by selling virtual goods in a business, but can only acquire virtual cash by exchanging legal currency. In some implementations, virtual cash may also be awarded for leveling up in the game.

Harvest Mechanic

In various embodiments, an online game can include a series of user-initiated in-game actions that comprise a harvest mechanic. The harvest mechanic generally has two components: a set of initiating actions and a set of collecting (harvesting) actions. In an initiating action, a player may "click" or otherwise interact with an element of the online game to initiate the harvest mechanic. In some games, multiple clicks or other actions may be necessary to complete the initiating action. Furthermore, in some implementations, the initiating actions may require the player to expend resources, such as virtual currency, energy, virtual goods or supplies, and the like. For example, a player may have to click on a stove to clean it and click again to purchase and prepare ingredients and initiate cooking virtual food. These operations may cost the player energy and/or virtual currency. In another example, a player may have to click on a segment of land to plow it and click again to purchase and plant seeds and initiate growing virtual crops.

Once the initiating action is complete, the online game may begin a processing action, wherein the game state of the element is modified by the game system during some waiting time period. The time period can range from seconds to days, depending on the game system. For example, the game system may require an hour for virtual food to get cooked, or it may require three days for a virtual crop to grow. During the processing action, the player may be able to cancel the processing action, thereby resetting the entire harvest mechanic sequence. During the processing action, the player may also be able to interact with the element. For example, the player could add spice to his virtual food while it is cooking, or the player could add fertilizer to his virtual crops while they are growing. These interactions may or may not have an in-game effect on the element. In some embodiments, there is no processing action or waiting time period, and the collecting action is accessible immediately after the initiating action is complete. In other embodiments, the processing action is instantaneous.

After the processing action is complete, the game system can alter the game state of the in-game asset. At this point, the collecting action may be available. In a collecting action, a player may click or otherwise interact with the element to complete the harvest mechanic cycle. For example, a player may have to click on the fully-cooked virtual food to serve it. In another example, a player may have to click on fully-grown crops to harvest them. In some games, multiple clicks or other actions may be necessary to complete the collecting action. Completion of the harvest mechanic typically results in a reward, such as virtual currency, in-game assets or other loot. Some harvest mechanics may also include an explicit penalty for not initiating the collection action within a threshold period of time. For example, crops may wither if not harvested within X hours of completing the processing action, where X may vary depending on crop type or other considerations.

Once the collecting action is complete, the harvest mechanic may be reset with respect to that game element. In some embodiments, the player may have to click or otherwise interact with the in-game asset to reset the harvest mechanic. In other embodiments, the harvest mechanic may reset automatically once the collecting action is complete. Once the harvest mechanic is reset, the initiating action may be available again for that game element.

A detailed example of the harvest mechanic follows in connection with an in-game asset representing a business. NPCs may visit the business and make purchases of items. The business may be a retail store, such as a restaurant or toy shop. The business may be visually represented as an in-game object located within the virtual game instance associated with the player. FIG. 3 illustrates an example business object 320 located in a game instance of the player. In some implementations, the game logic may require the player to purchase the business and/or perform a series of operations to build the business, which such actions may require the expenditure of energy and/or some in-game credit or currency. In this manner, a player may establish a plurality of businesses of the same type or different types within the game instance of the player.

In one implementation, the harvest mechanic associated with the business object 320 may involve three phases. An initiating phase may involve the user supplying the business with units of virtual goods or supplies. In one implementation, the minimum number of units required to initiate the harvest mechanic may vary depending on the type of business. The player may be required to purchase goods units (or replenish an existing supply of goods units) using virtual currency or other in-game assets or credits. Each goods unit may require the player to The wait or processing phase may involve one or more NPCs (or player characters separately) visiting the business to consume the goods of the business. The rate at which goods are consumed can be based on the number or population of NPCs in the game instance of the player. Game logic may apply a function that considers a variety of attributes to control the population of NPCs, such as the number and size of the housing structures within the game instance of a player. The processing phase ends and the collection (harvesting) phase begins, when all goods of the business have been consumed. For example, the business object may include a visual identifier that indicates that collection is available. A user may click on the business object to collect virtual currency (or other loot) resulting from completion of the harvest mechanic cycle. In some implementations, there is no wither or penalty component. In other implementations, a penalty can be assessed if a player fails to initiate a collection operation within a threshold period of time. For example, a business may be "robbed" or employees may steal from the cash registers.

Supply Chain Harvest Mechanic with Social Fulfillment

In one implementation, the process by which a player acquires goods units in order to initiate the harvest mechanic discussed above may itself also involve a harvest mechanic including an initiation phase, a wait or processing phase and a collection phase. In the initiation phase, the player may select an amount of goods units to purchase. The wait or processing phase may involve an elapsed time passing before the player is allowed to access the ordered goods units. In the collection phase, the player acknowledges the supply of goods units and receives them into inventory for use in connection with the harvest mechanic discussed above, for example. In a particular implementation, the wait or processing phase may include a social component. For example, a player may opt to initiate a social fulfillment work flow, according to which other players are invited to sell goods units or otherwise contribute to the supply of goods units requested by the player.

Figure 6:
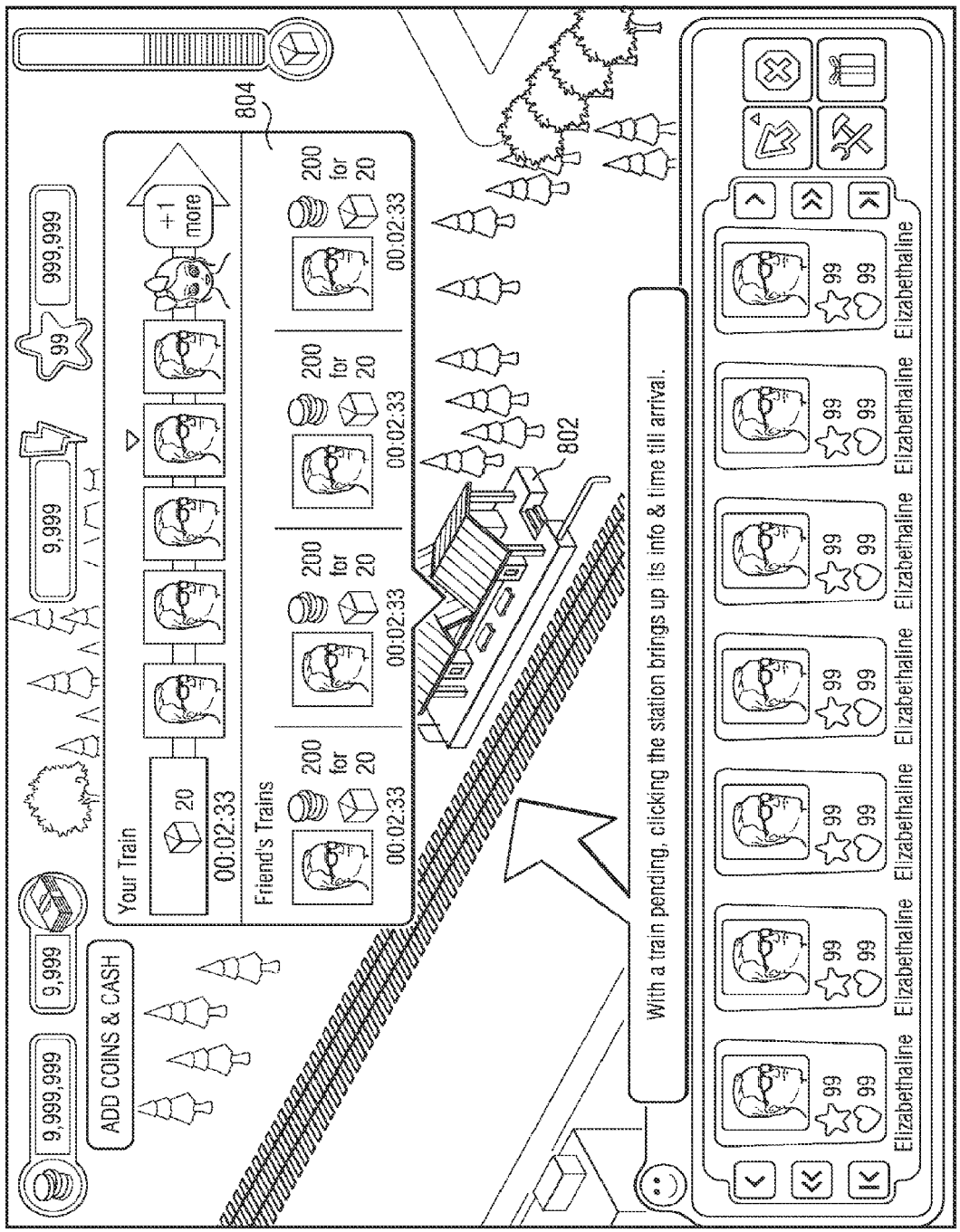
FIG. 6 illustrates an example of a game interface for an online game.

In one implementation, the concept of a train carrying supplies provides an apt analogy and an example story line suitable for use in a game including the supply chain harvest mechanic. Other analogies can be used as well for the games, such as trucks, ships, delivery vans and the like. FIG. 6 illustrates a graphical user interface that includes a train station object 802. In response to user activation (e.g., a click on the train station object 802), the game application may provide a train schedule interface 804 indicating the time remaining until arrival of one or more scheduled trains. FIG. 4 illustrates a process flow according to one implementation of the invention directed to ordering and scheduling goods units for delivery. The process flow of FIG. 4 may be initiated when a player clicks on the train station object. When a train has arrived at the station or there are trains pending (402), the game application displays the train schedule interface 804 (404) From the train schedule interface 804, a player may view the time that is required to elapse before one or more trains arrive (and associated goods are available. From this interface, a player may select a train that has arrived and receive the goods into inventory. In other implementations, a player may click directly on a train object that has arrived at the station to receive the goods units into inventory. In addition, a player may also schedule additional trains, as described below.

Figure 7:
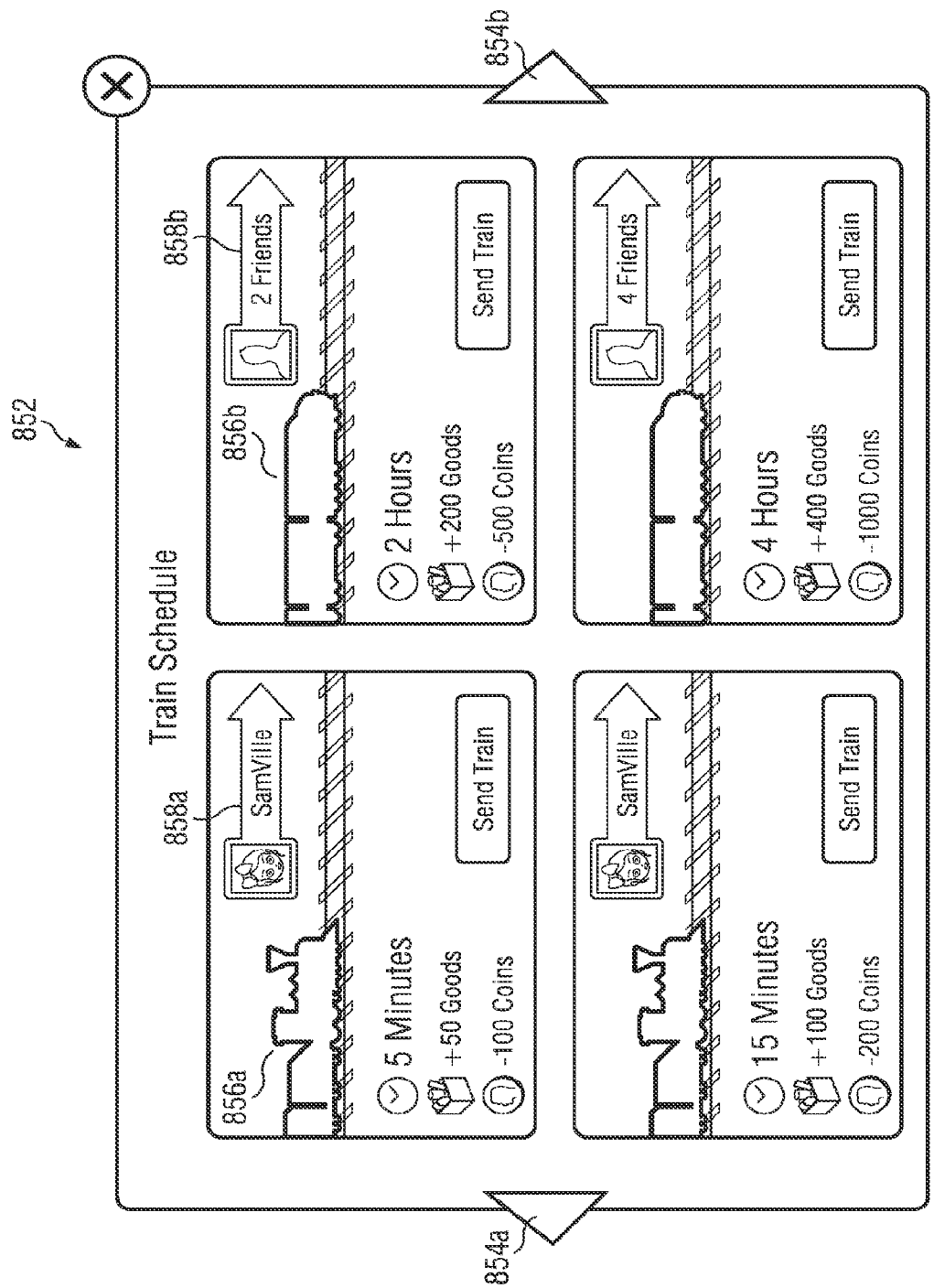
FIG. 7 illustrates an example of a game interface for an online game.

As FIG. 4 illustrates, if no trains are in the station or pending, the game application displays a train scheduling dialog interface (406). FIG. 7 sets forth an example train scheduling interface 852. In the example illustrated in FIG. 7, the training scheduling interface 852 comprises one or more train scheduling option panels 856a, 856b. A player may activate scrolling arrows 854a, 854b to view and select additional scheduling options panels. As FIG. 7 shows, each scheduling option panel identifies a time required for delivery (which is the wait or processing time in the harvest mechanic), the amount of goods units (e.g., 50 units), and the cost of the goods units (e.g., 100 virtual coins). Option panels 856a, 856b also include destination identifiers 858a, 858b that indicate whether the corresponding scheduling option includes a social fulfillment component. The destination identifier 858a identifies "SamVille," which (in one implementation) is essentially a pseudo game instance associated with a NPC. If this option is selected, the train from the user perspective is sent to the game instance of the NPC for fulfillment of the ordered goods units. Destination identifier 858b includes the text "2 Friends," indicating that the social fulfillment option includes sending invitations two other players. Other options may include lesser or fewer friends or contacts. If a player selects a scheduling option with a social fulfillment component, the game application will query the user to identify N contacts that are to be sent an invite, where N equals the under of contacts identified in the option panel. In one implementation, the game application may access a list or other data structure of the player's in-game contacts and display the list to the player for selection. In other implementations, the interface may include a text field with look-ahead functions that scan the list of in-game contacts to suggest auto-completion operations. In some implementations, the game application can programmatically select contacts in lieu of the player. For example, the game application may make random selections from among the in-game contacts of the player, in other implementations, the game application may send notifications to all in-game contacts of the player.

Referring back to FIG. 4, the game application receives a train schedule selection from the player (408). If the selection includes a social contact fulfillment option (410), the game application dispatches train requests to the selected contacts (412). The game application then adds the newly scheduled train to the train schedule information associated with the game instance of the player (414), thereby completing the initiation phase of the supply chain harvest mechanic. In one implementation, the game application adds an entry to a data structure associated with the game instance of the player that identifies the number of goods ordered, a time stamp associated with the order, and an expiration time. As described below, the game application makes the goods units available to the player after expiration of the wait time of the harvest mechanic, the duration of which is defined by the time indicator associated with the selected delivery option.

During the wait or processing phase, the game application may send notifications (here, "train requests") to the selected contacts. The train request is an invitation to the selected contact to supply all or a portion of the goods units requested by the player in exchange for an award of virtual currency (or other in-game credit or asset). FIG. 5 illustrates a process flow directed to handling train requests. A selected contact may not be currently playing the game when the player initiates the supply chain harvest mechanic. FIG. 5 illustrates a process flow that may be executed when the contact first access the game application. As part of initializing a game instance, the game application may access a message queue to determine whether there are any pending train requests for a player to accept (502). If so, the game application displays a train request dialog interface (504). The game application may filter out the train requests where the corresponding wait time has expired. The train request dialog interface may identify the player contact associated with the request, the amount of goods requested and an award for fulfilling the request. For example, if the player accepts the train request (506), the game application may increment the virtual coins of the player (508). If there are no more train requests to accept (510), the game application enters the game instance (512). FIG. 5 illustrates a work flow executed during initialization of the game. If the selected contact is currently accessing the game system may send an in-game message to the selected contact to initiate a similar work flow.

As discussed above, upon expiration of the wait time, the game application causes the goods units to be made available to the player. In the implementations described above, acceptance of unexpired train requests sent to contacts of the player in connection with the social fulfillment component is not a condition of the player receiving the goods. In other words, the game application causes the goods units to be made available to the player upon expiration of waiting time, regardless of the train scheduling option selected. This is in contrast to a gift request that is not fulfilled unless the contact accepts and actually fulfills the gift request.

In some implementations, the game application may be configured to provide certain incentives to the player for selecting a supply scheduling option that includes a social fulfillment component. For example, the options including a social fulfillment component may cost less in terms or virtual currency for the same number of goods units. In other implementations, the wait time can be shorter for the same number of goods units. In some implementations, the wait time can end as soon as a requested contact of the player accepts the train request. In other implementations, the wait time can be decremented by a predefined amount if the contact accepts the train request. In some implementations, the game application may be configured to provide certain incentives to the contact for accepting the train request. For example, the contact may be offered a higher price for the goods units such that the contact profits from the sale. The contact may be offered virtual cash, as opposed to virtual currency in a dual-currency model, for accepting the train request or a threshold number of train requests. The contact may also be awarded for social behavior, such as accepting train requests in the aggregate, by being awarded loyalty or helpfulness credits and the like. Incentives may induce players to use the social fulfillment component thereby promoting interaction between players and thereby increasing retention and user activity generally. Furthermore, limiting the social fulfillment component (and its associated benefits) to players that have made in-game contacts with other players provides players with incentives to establish in-game contacts (thereby increasing viral functions of the game).

Data Flow

Figure 8:
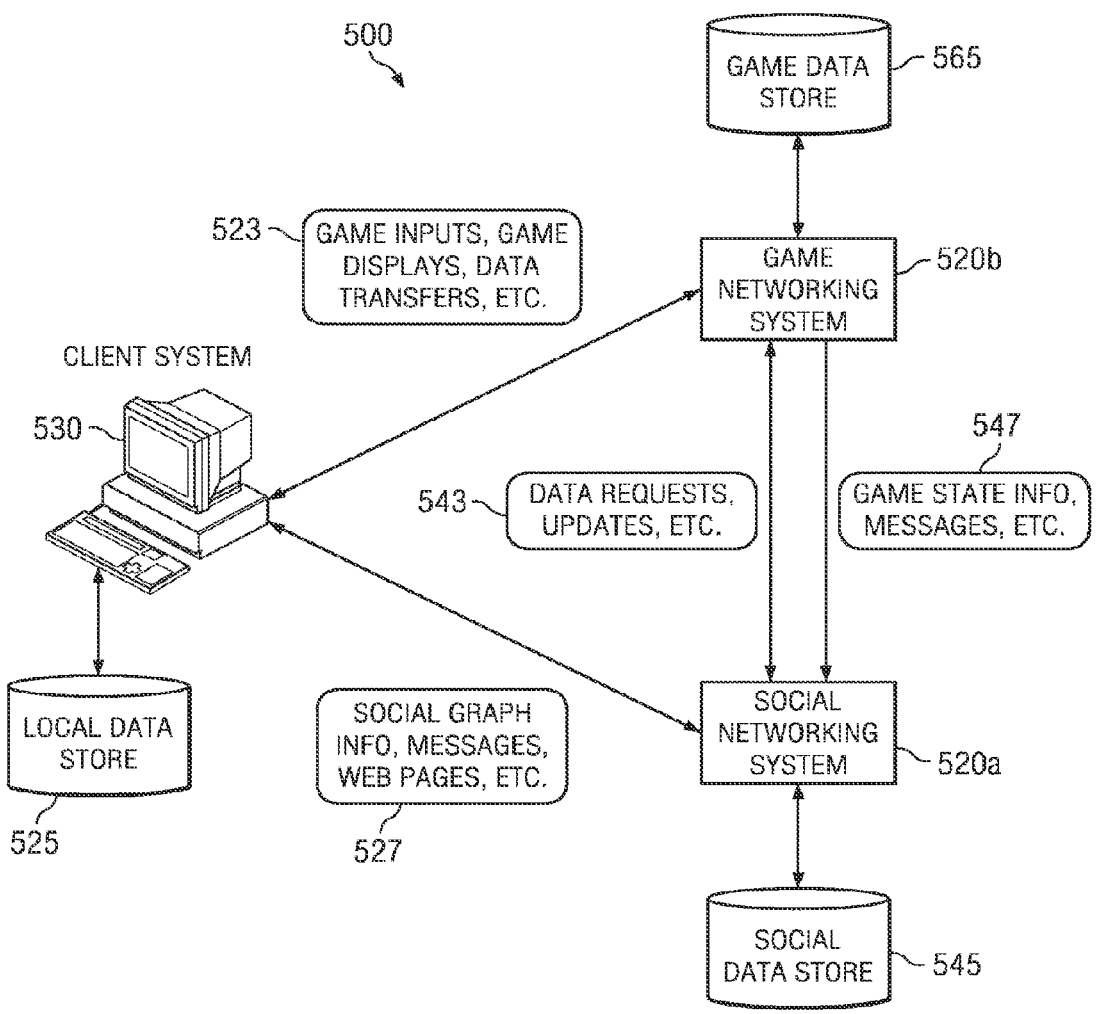
FIG. 8 illustrates an example data flow in a system.

FIG. 8 illustrates an example data flow between the components of system 500. In particular embodiments, system 500 can include client system 530, social networking system 520a, and game networking system 520b. The components of system 500 can be connected to each other in any suitable configuration, using any suitable type of connection. The components may be connected directly or over any suitable network. Client system 530, social networking system 520a, and game networking system 520b can each have one or more corresponding data stores such as local data store 535, social data store 545, and game data store 565, respectively. Social networking system 520a and game networking system 520b can also have one or more servers that can communicate with client system 530 over an appropriate network. Social networking system 520a and game networking system 520b can have, for example, one or more internet servers for communicating with client system 530 via the Internet. Similarly, social networking system 520a and game networking system 520b can have one or more mobile servers for communicating with client system 530 via a mobile network (e.g., GSM, PCS, Wi-Fi, WPAN, etc.). In some embodiments, one server may be able to communicate with client system 530 over both the Internet and a mobile network. In other embodiments, separate servers can be used.

Client system 530 can receive and transmit data 523 to and from game networking system 520b. This data can include, for example, webpages, messages, game inputs, game displays, HTTP packets, data requests, transaction information, updates, and other suitable data. At some other time, or at the same time, game networking system 520b can communicate data 543, 547 (e.g., game state information, game system account information, page info, messages, data requests, updates, etc.) with other networking systems, such as social networking system 520a (e.g., Facebook, Myspace, etc.). Client system 530 can also receive and transmit data 527 to and from social networking system 520a. This data can include, for example, webpages, messages, social graph information, social network displays, HTTP packets, data requests, transaction information, updates, and other suitable data.

Communication between client system 530, social networking system 520a, and game networking system 520b can occur over any appropriate electronic communication medium or network using any suitable communications protocols. For example, client system 530, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTP-S, FTP, SNMP, TELNET, and a number of other protocols, may be used. In addition, a server in one interaction context may be a client in another interaction context. In particular embodiments, the information transmitted between hosts may be formatted as HyperText Markup Language (HTML) documents. Other structured document languages or formats can be used, such as XML, and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on game networking system 520*b*, the BLOB containing the game state for the instance corresponding to the player can be transmitted to client system 530 for use by a client-side executed object to process. In particular embodiments, the client-side executable may be a FLASH-based game, which can de-serialize the game state data in the BLOB. As a player plays the game, the game logic implemented at client system 530 maintains and modifies the various game state parameters locally. The client-side game logic may also batch game events, such as mouse clicks, and transmit these events to game networking system 520*b*. Game networking system 520*h* may itself operate by retrieving a copy of the BLOB from a database or an intermediate memory cache (memcache) layer. Game networking system 520*b* can also de-serialize the BLOB to resolve the game state parameters and execute its own game logic based on the events in the batch file of events transmitted by the client to synchronize the game state on the server side. Game networking system 520*b* may then re-serialize the game state, now modified, into a BLOB and pass this to a memory cache layer for lazy updates to a persistent database.

With a client-server environment in which the online games may run, one server system, such as game networking system 520*b*, may support multiple client systems 530. At any given time, there may be multiple players at multiple client systems 530 all playing the same online game. In practice, the number of players playing the same game at the same time may be very large. As the game progresses with each player, multiple players may provide different inputs to the online game at their respective client systems 530, and multiple client systems 530 may transmit multiple player inputs and/or game events to game networking system 520*b* for further processing. In addition, multiple client systems 530 may transmit other types of application data to game networking system 520*b*.

In particular embodiments, a computed-implemented game may be a text-based or turn-based game implemented as a series of web pages that are generated after a player selects one or more actions to perform. The web pages may be displayed in a browser client executed on client system 530. As an example and not by way of limitation, a client application downloaded to client system 530 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe Flash-based technologies. As an example and not by way of limitation, a game may be fully or partially implemented as a SWF object that is embedded in a web page and executable by a Flash media player plug-in. In particular embodiments, one or more described webpages may be associated with or accessed by social networking system 520*a*. This disclosure contemplates using any suitable application for the retrieval and rendering of structured documents hosted by any suitable network-addressable resource or website.

Application event data of a game is any data relevant to the game (e.g., player inputs) In particular embodiments, each application datum may have a name and a value, and the value of the application datum may change (i.e., be updated) at any time. When an update to an application datum occurs at client system 530, either caused by an action of a game player or by the game logic itself, client system 530 may need to inform game networking system 520*b* of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 500 is discussed in reference to updating a multi-player online game hosted on a network-addressable system (such as, for example, social networking system 520*a* or game networking system 520*b*), where an instance of the online game is executed remotely on a client system 530, which then transmits application event data to the hosting system such that the remote game server synchronizes game state associated with the instance executed by the client system 530.

In particular embodiment, one or more objects of a game may be represented as an Adobe Flash object. Flash may manipulate vector and raster graphics, and supports bidirectional streaming of audio and video. "Flash" may mean the authoring environment, the player, or the application files. In particular embodiments, client system 530 may include a Flash client. The Flash client may be configured to receive and run Flash application or game object code from any suitable networking system (such as, for example, social networking system 520*a* or game networking system 520*b*). In particular embodiments, the Flash client may be run in a browser client executed on client system 530. A player can interact with Flash objects using client system 530 and the Flash client. The Flash objects can represent a variety of in-game objects. Thus, the player may perform various in-game actions on various in-game objects by make various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at client system 530, the Flash client may send the events that caused the game state changes to the in-game object to game networking system 520b. However, to expedite the processing and hence the speed of the overall gaming experience, the Flash client may collect a batch of some number of events or updates into a batch file. The number of events or updates may be determined by the Flash client dynamically or determined by game networking system 520b based on server loads or other factors. For example, client system 530 may send a batch file to game networking system 520b whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 530. In particular embodiments, the batch file may be a text file and the name-value pairs may be in string format.

In particular embodiments, when a player plays an online game on client system 530, game networking system 520b may serialize all the game-related data, including, for example and without limitation, game states, game events, user inputs, for this particular user and this particular game into a BLOB and stores the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game the player is in. When a player resumes playing the game next time, game networking system 520b may retrieve the corresponding BLOB from the database to determine the most-recent values of the game-related data. In particular embodiments, while a player is playing the online game, game networking system 520b may also load the corresponding BLOB into a memory cache so that the game system may have faster access to the BLOB and the game-related data contained therein.

Systems and Methods

In particular embodiments, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity (such as a business or third party application).

Figure 9:
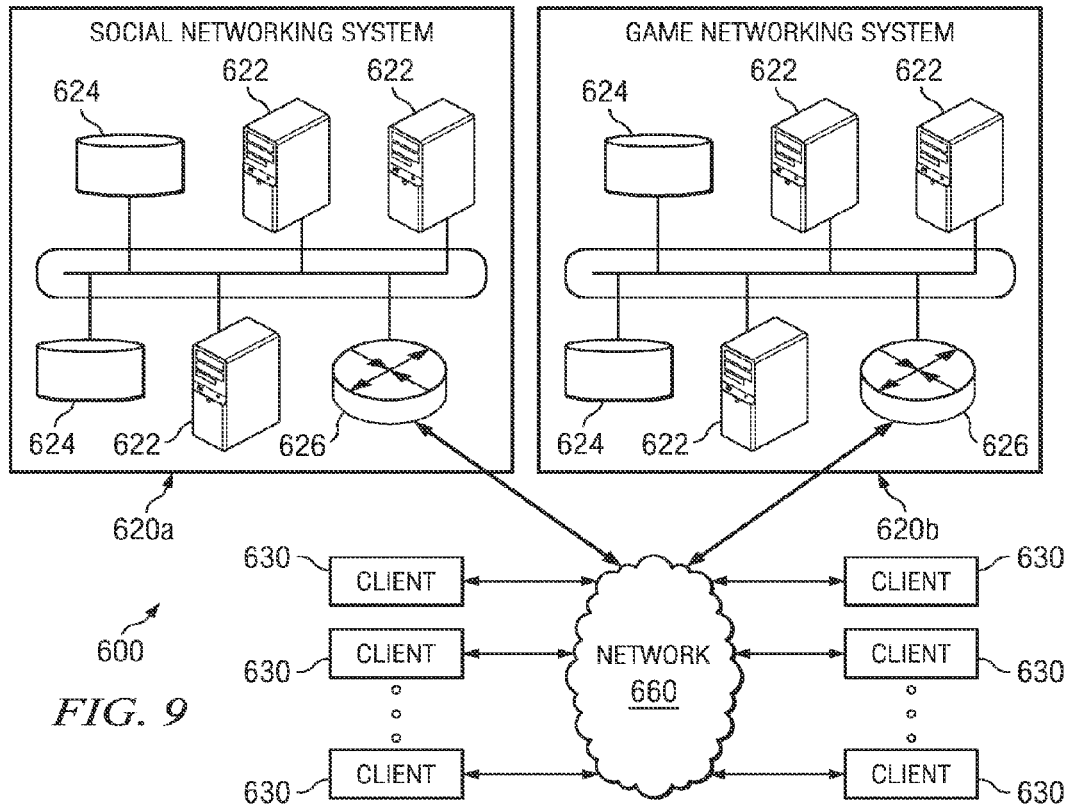
FIG. 9 illustrates an example network environment.

Particular embodiments may operate in a wide area network environment, such as the Internet, including multiple network addressable systems. FIG. 9 illustrates an example network environment, in which various example embodiments may operate. Network cloud 660 generally represents one or more interconnected networks, over which the systems and hosts described herein can communicate. Network cloud 660 may include packet-based wide area networks (such as the Internet), private networks, wireless networks, satellite networks, cellular networks, paging networks, and the like. As FIG. 9 illustrates, particular embodiments may operate in a network environment comprising one or more networking systems, such as social networking system 620a, game networking system 620b, and one or more client systems 630. The components of social networking system 620a and game networking system 620b operate analogously; as such, hereinafter they may be referred to simply at networking system 620. Client systems 630 are operably connected to the network environment via a network service provider, a wireless carrier, or any other suitable means.

Networking system 620 is a network addressable system that, in various example embodiments, comprises one or more physical servers 622 and data stores 624. The one or more physical servers 622 are operably connected to computer network 660 via, by way of example, a set of routers and/or networking switches 626. In an example embodiment, the functionality hosted by the one or more physical servers 122 may include web or HTTP servers, FTP servers, as well as, without limitation, webpages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), Flash, ActionScript, and the like.

Physical servers 622 may host functionality directed to the operations of networking system 620. Hereinafter servers 622 may be referred to as server 622, although server 622 may include numerous servers hosting, for example, networking system 620, as well as other content distribution servers, data stores, and databases. Data store 624 may store content and data relating to, and enabling, operation of networking system 620 as digital data Objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 624 corresponds to one or more of a variety of separate and integrated databases, such as relational databases and object-oriented databases, that maintain information as an integrated collection of logically related records or files stored on one or more physical systems. Structurally, data store 624 may generally include one or more of a large class of data storage and management systems. In particular embodiments, data store 624 may be implemented by any suitable physical system(s) including components, such as one or more database servers, mass storage media, media library systems, storage area networks, data storage clouds, and the like. In one example embodiment, data store 624 includes one or more servers, databases (e.g., MySQL), and/or data warehouses. Data store 624 may include data associated with different networking system 620 users and/or client systems 630.

Client system 630 is generally a computer or computing device including functionality for communicating (e.g., remotely) over a computer network. Client system 630 may be a desktop computer, laptop computer, personal digital assistant (PDA), in- or out-of-car navigation system, smart phone or other cellular or mobile phone, or mobile gaming device, among other suitable computing devices. Client system 630 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 630 to enter addresses of specific network resources to be retrieved, such as resources hosted by networking system 620. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is the Hypertext Markup Language (HTML), Other common web browser-supported languages and technologies include the Extensible Markup Language (XML), the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 630 desires to view a particular webpage (hereinafter also referred to as target structured document) hosted by networking system 620, the user's web browser, or other document rendering engine or suitable client application, formulates and transmits a request to networking system 620. The request generally includes a URL or other document identifier as well as metadata or other information. By way of example, the request may include information identifying the user, such as a user ID, as well as information identifying or characterizing the web browser or operating system running on the user's client computing device 630. The request may also include location information identifying a geographic location of the user's client system or a logical network location of the user's client system. The request may also include a timestamp identifying when the request was transmitted.

Although the example network environment described above and illustrated in FIG. 6 described with respect to social networking system 620a and game networking system 620b, this disclosure encompasses any suitable network environment using any suitable systems. As an example and not by way of limitation, the network environment may include online media systems, online reviewing systems, online search engines, online advertising systems, or any combination of two or more such systems.

Figure 10:
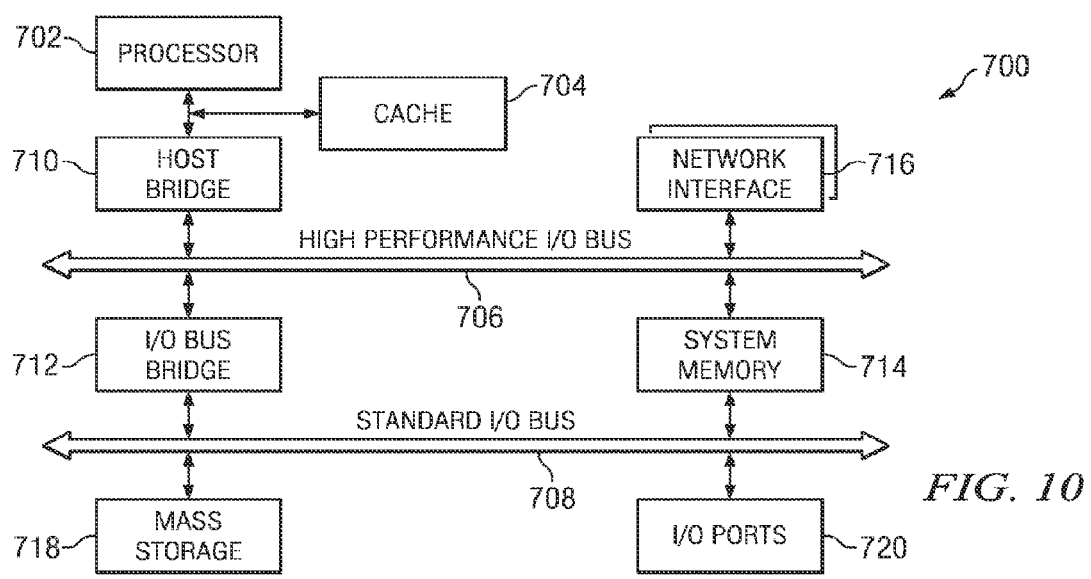
FIG. 10 illustrates an example computer system architecture.

FIG. 10 illustrates an example computing system architecture, which may be used to implement a server 622 or a client system 630. In one embodiment, hardware system 700 comprises a processor 702, a cache memory 704, and one or more executable modules and drivers, stored on a tangible computer readable medium, directed to the functions described herein. Additionally, hardware system 700 may include a high performance input/output (I/O) bus 706 and a standard I/O bus 708. A host bridge 710 may couple processor 702 to high performance I/O bus 706, whereas I/O bus bridge 712 couples the two buses 706 and 708 to each other. A system memory 714 and one or more network/communication interfaces 716 may couple to bus 706. Hardware system 700 may further include video memory (not shown) and a display device coupled to the video memory. Mass storage 718 and I/O ports 720 may couple to bus 708. Hardware system 700 may optionally include a keyboard, a pointing device, and a display device (not shown) coupled to bus 708. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 700 are described in greater detail below. In particular, network interface 716 provides communication between hardware system 700 and any of a wide range of networks, such as an Ethernet (e.g., IEEE 802.3) network, a backplane, etc. Mass storage 718 provides permanent storage for the data and programming instructions to perform the above-described functions implemented in servers 422, whereas system memory 714 (e.g., DRAM) provides temporary storage for the data and programming instructions when executed by processor 702. I/O ports 720 are one or more serial and/or parallel communication ports that provide communication between additional peripheral devices, which may be coupled to hardware system 700.

Hardware system 700 may include a variety of system architectures and various components of hardware system 700 may be rearranged. For example, cache 704 may be on-chip with processor 702. Alternatively, cache 704 and processor 702 may be packed together as a "processor module," with processor 702 being referred to as the "processor core." Furthermore, certain embodiments of the present disclosure may not require nor include all of the above components. For example, the peripheral devices shown coupled to standard I/O bus 708 may couple to high performance I/O bus 706. In addition, in some embodiments, only a single bus may exist, with the components of hardware system 700 being coupled to the single bus. Furthermore, hardware system 700 may include additional components, such as additional processors, storage devices, or memories.

An operating system manages and controls the operation of hardware system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Miscellaneous

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, white embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. Still further, while the embodiments described above operate with business-related virtual objects (such as stores and restaurants), the invention can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims,

What is claimed is:

1. A computer-implemented method comprising:
    receiving a request for in-game supplies from a first player in an interactive social game;
    presenting, using one or more processors, a plurality of supply options to the first player in response to receiving the request, each supply option having an associated processing time;
    receiving a supply option selection from the first player, the supply option selection indicating selection of one of the plurality of supply options;
    receiving an identity of a second player from the first player;
    distributing a supply fulfillment invitation to the second player based on the selected supply option from the first player using a graphical expression of a supply delivery vehicle, the supply fulfillment invitation being associated with an expiration time;
    shortening the processing time associated with the selected supply option in response to acceptance of the supply fulfillment invitation by the second player prior to the expiration time; and
    presenting the graphical expression of the supply delivery vehicle to the first player upon completion of the processing time for the selected supply option, the graphical expression of the supply delivery vehicle representing availability of the requested in-game supplies to the first player.

2. The computer-implemented method of claim 1, wherein the requested in-game supplies include a plurality of in-game assets.

3. The computer-implemented method of claim 1, wherein the graphical expression of the delivery vehicle includes the expiration time associated with the supply fulfillment invitation.

4. The computer-implemented method of claim 1, further comprising displaying a graphical representation of a status of the supply fulfillment invitation to the first player.

5. The computer-implemented method of claim 4, wherein the graphical representation of the status of the supply fulfillment invitation is displayed to the first player via the graphical expression of the supply delivery vehicle.

6. The computer-implemented method of claim 1, further comprising providing an in-game benefit to the second player in response to acceptance of the supply fulfillment invitation.

7. The computer-implemented method of claim 1, wherein the second player is a friend of the first player.

8. The computer-implemented method of claim 1, wherein the second player is not actively playing the interactive social game at the time of distributing the supply fulfillment invitation to the second player.

9. The computer-implemented method of claim 1, wherein each supply option further has an associated quantity of in-game supplies.

10. The computer-implemented method of claim 1, wherein each supply option further has an associated cost.

11. An apparatus comprising:
    an interface to communicate with players of an interactive social game;
    a memory to store data associated with the interactive social game; and one or more processors coupled to the interface and the memory, the one or more processors configured to:

present a plurality of supply options to a first player in response to a request for in-game supplies from the first player, each supply option having an associated processing time;

receive a supply option selection from the first player, the supply option selection indicating selection of one of the plurality of supply options;

receive an identity of one or more second players from the first player;

distribute a supply fulfillment invitation to each of the second players based on the selected supply option from the first player using a graphical expression of a supply delivery vehicle, the supply fulfillment invitation being associated with an expiration time;

shorten the processing time associated with the selected supply option in response to acceptance of the supply fulfillment invitation by at least one second player prior to the expiration time; and present the graphical expression of the supply delivery vehicle to the first player upon completion of the processing time for the selected supply option, the graphical expression of the supply delivery vehicle representing availability of the requested in-game supplies to the first player.

12. The apparatus of claim 11, wherein the requested in-game supplies include a plurality of in-game assets having value in the interactive social game.

13. The apparatus of claim 11, wherein the one or more processors further provide an in-game benefit to each second player that accepts the supply fulfillment invitation.

14. The apparatus of claim 11, wherein at least one of the second players is not actively playing the interactive social game when the supply fulfillment invitation is distributed to each of the second players.

15. A non-transitory machine-readable storage medium comprising instructions that, when executed by one or more processors of a machine, cause the machine to perform operations comprising:

receiving a request for in-game supplies from a first player in an interactive social game;

presenting a plurality of supply options to the first player in response to receiving the request, each supply option having an associated processing time;

receiving a supply option selection from the first player, the supply option selection indicating selection of one of the plurality of supply options;

receiving an identity of a second player from the first player;

distributing a supply fulfillment invitation to the second player based on the selected supply option from the first player using a graphical expression of a supply delivery vehicle, the supply fulfillment invitation being associated with an expiration time;

shortening the processing time associated with the selected supply option in response to acceptance of the supply fulfillment invitation by the second player prior to the expiration time; and presenting the graphical expression of the supply delivery vehicle to the first player upon completion of the processing time for the selected supply option, the graphical expression of the supply delivery vehicle representing availability of the requested in-game supplies to the first player.

* * * * *

UNITED STATES PATENT AND TRADEMARK OFFICE
CERTIFICATE OF CORRECTION

PATENT NO.        : 8,133,116 B1  
APPLICATION NO.   : 13/244895  
DATED             : March 13, 2012  
INVENTOR(S)       : Sean U. Kelly et al.

It is certified that error appears in the above-identified patent and that said Letters Patent is hereby corrected as shown below:

On the title page, item (56), under "Other Publications", in column 2, line 2, delete "Retrived" and insert -- Retrieved --, therefor.

On page 2, under "Other Publications", in column 1, line 2, delete "Retrived" and insert -- Retrieved --, therefor.

On page 2, under "Other Publications", in column 2, line 4, delete "[retrived" and insert -- [retrieved --, therefor.

On page 2, under "Other Publications", in column 2, line 6, delete "ned" and insert -- need --, therefor.

On page 2, under "Other Publications", in column 2, line 35, delete "Empiracal" and insert -- Empirical --, therefor.

On page 2, under "Other Publications", in column 2, line 35, delete "Conceptural" and insert -- Conceptual --, therefor.

Signed and Sealed this  
Nineteenth Day of June, 2012

David J. Kappos  
*Director of the United States Patent and Trademark Office*